(12) United States Patent
Kim

(10) Patent No.: US 7,760,410 B2
(45) Date of Patent: Jul. 20, 2010

(54) MIRROR SUPPORT DEVICE AND OPTICAL SCANNING APPARATUS ADOPTING THE SAME

(75) Inventor: Jung-kwon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 11/304,758

(22) Filed: Dec. 16, 2005

(65) Prior Publication Data
US 2006/0132881 A1 Jun. 22, 2006

(30) Foreign Application Priority Data
Dec. 18, 2004 (KR) .................. 10-2004-0108400

(51) Int. Cl.
G02B 26/08 (2006.01)
G02B 7/182 (2006.01)
A47F 7/14 (2006.01)
B41J 15/14 (2006.01)
B41J 27/00 (2006.01)

(52) U.S. Cl. .............. 359/221.2; 359/871; 248/488; 347/242; 347/257

(58) Field of Classification Search .......... 359/196, 359/838, 846, 847, 848, 849, 871; 347/242, 347/257; 248/488
See application file for complete search history.

(56) References Cited

U.S. PATENT DOCUMENTS

| | | | | |
|---|---|---|---|---|
| 5,301,060 A | * | 4/1994 | Niikawa et al. ............ | 359/218 |
| 5,390,051 A | | 2/1995 | Saito | |
| 6,361,177 B2 | * | 3/2002 | Umetsu .................... | 359/871 |
| 6,676,267 B2 | * | 1/2004 | Takase ..................... | 359/872 |
| 2002/0118628 A1 | * | 8/2002 | Tachikawa et al. ....... | 369/112.29 |
| 2003/0039040 A1 | * | 2/2003 | Chee ........................ | 359/871 |
| 2003/0053184 A1 | * | 3/2003 | Takase ..................... | 359/196 |
| 2003/0234989 A1 | * | 12/2003 | Oshino et al. ............. | 359/811 |
| 2004/0190096 A1 | * | 9/2004 | Takase ..................... | 359/196 |

FOREIGN PATENT DOCUMENTS

JP  59-111614  6/1984

(Continued)

OTHER PUBLICATIONS

"contact." Merriam-Webster Online Dictionary. 2009. Merriam-Webster Online. Feb. 25, 2009 <http://www.merriam-webster.com/dictionary/contact>.*

Primary Examiner—Stephone B Allen
Assistant Examiner—Jade R Callaway
(74) Attorney, Agent, or Firm—Roylance, Abrams, Berdo & Goodman, L.L.P.

(57) ABSTRACT

A mirror support device has a frame with a mounting surface on which a mirror is mounted at an angle. An elastic member has a first end, a second end, and a plurality of pressing portions. The first end is fixed to the top of the frame, and the second end urges the mirror towards the mounting surface to fix the mirror to mounting surface. The plurality of pressing portions abut against the mirror when the second end urges the mirror towards the mounting surface. The pressing portion increases and more effectively apply a pressing force for supporting and fixing the mirror. Therefore, the mirror is fixed more securely and stably without deviation and deformation, and light scanning error and image quality degradation is prevented.

21 Claims, 13 Drawing Sheets

FOREIGN PATENT DOCUMENTS

| | | |
|---|---|---|
| JP | 61-278811 | 12/1986 |
| JP | 06-324253 | 11/1994 |
| JP | 06324253 A * | 11/1994 |
| JP | 11-153770 | 6/1999 |
| JP | 11-352602 | 12/1999 |
| JP | 2002-148547 | 5/2002 |
| JP | 2002182145 A * | 6/2002 |
| JP | 2002-267984 | 9/2002 |
| KR | P 1989-11297 | 7/1989 |
| KR | 93-26216 | 12/1993 |
| KR | P1997-10733 | 3/1997 |

* cited by examiner ated on Dec. 18, 2004, in the Korean Intellectual Property Office, the entire disclosure of which is hereby incorporated by reference.

MIRROR SUPPORT DEVICE AND OPTICAL SCANNING APPARATUS ADOPTING THE SAME

CROSS-REFERENCE TO RELATED PATENT APPLICATION

This application claims the benefit under 35 U.S.C. §119(a) of Korean Patent Application No. 10-2004-0108400, filed on Dec. 18, 2004, in the Korean Intellectual Property Office, the entire disclosure of which is hereby incorporated by reference.

BACKGROUND OF THE INVENTION

1. Field of the Invention

The present invention relates to a mirror support device and an optical scanning apparatus using the mirror support device. More particularly, the present invention relates to a mirror support device for stably mounting a mirror that reflects incident light in an optical scanning apparatus.

2. Description of the Related Art

Optical scanning apparatuses, such as laser scanning units (LSUs), are widely used for image forming devices and image reading devices such as digital copiers, electrophotographic image forming apparatuses, facsimiles, and barcode readers. In an optical system, the optical scanning apparatus uses a mirror to direct light to a desired location. Therefore, the optical scanning apparatus has a mirror support device to support the mirror and control the reflection of light by the mirror.

FIG. 1 is a partial exploded perspective view of a conventional mirror support device, and FIG. 2 is a partial side view, partially cut away, of the mirror support device depicted in FIG. 1. Referring to FIGS. 1 and 2, a mirror support device includes a mirror 5, a frame 10, and an elastic member 40. The mirror 5 reflects incident light to a desired location.

The frame 10 includes a mounting surface 12, a supporting surface 13, and a guide 14. The mounting surface 12 is sloped, and the mirror 5 is laid on the sloped mounting surface 12. The supporting surface 13 is located under the mounting surface 12 and is substantially perpendicular to the mounting surface 12 to support the bottom of the mirror 5 and prevent the mirror 5 from slipping down. The guide 14 protrudes from the top of the frame 10. The guide 14 couples with a guide hole 42 of the elastic member 40. That is, the guide 14 determines the installation location of the elastic member 40. Also, the frame 10 has a coupling hole 18 on its top. The coupling hole 18 is spaced apart from the guide 14 and is aligned with a coupling hole 44 of the elastic member 40. A coupling member, such as a screw (not shown), may be secured in the coupling hole 18 through the coupling hole 44 to fix the elastic member 40 to the frame 10.

The elastic member 40 has one end fixed at the top of the frame 10. The other end of the elastic member urges the mirror 5 toward the mounting surface 12. That is, the elastic member 40 biases the mirror 5 to the mounting surface 12 to elastically fix the mirror 5 to the frame 10. The shape of the elastic member 40 corresponds to the shape of the frame 10 so that the elastic member 40 can effectively hold the mirror without interfering with other parts. The elastic member 40 has a pressing portion 50 at the distal end. The pressing portion 50 makes contact along a single line with the mirror 5 when the elastic member 40 presses the mirror against the mounting surface 12.

As described above, the mirror 5 contacts the pressing portion 50 of the elastic member 40 when it is fixed to the mounting surface 12 of the frame. An arrow in FIG. 2 shows the direction of the pressing force acting on the mirror 5 by the elastic member 40. That is, the mirror 5 receives the pressing force only along a single contact line when it is fixed on the frame 10.

Since the pressing force of elastic member 40 acts only on a portion of the mirror 5 when the mirror 5 is fixed to the frame 10, the mirror 5 can be moved by impact. Also, since the pressing force of the elastic member 40 acts only along a single contact line between the pressing portion 50 and the mirror 5, the pressing force does not press effectively enough on the mirror 5, which allows the mirror 5 to deviate from its proper position when it is impacted.

Further, the conventional mirror support device does not deal effectively with machining errors in the mounting surface 12. That is, the mirror 5 may be separated from the mounting surface 12 or may receive the pressing force ineffectively. This causes the mirror 5 to vibrate and move from a proper position and thereby results in light scanning errors and image quality degradation.

Accordingly, there is a need for an improved mirror support device, and an optical scanning unit that uses the improved mirror support device.

SUMMARY OF THE INVENTION

An aspect of the present invention is to solve at least the above problems and/or disadvantages and to provide at least the advantages described below. Accordingly, an aspect of the present invention is to provide a mirror support device, and an optical scanning apparatus using the mirror support device, that increases and more effectively applies a pressing force for supporting and fixing a mirror to a frame.

According to an aspect of the present invention, a mirror support device includes a mirror that reflects light, a frame with a mounting surface on which the mirror is mounted at an angle, and an elastic member. One end of the elastic member is fixed to the top of the frame, and the other end presses the mirror towards the mounting surface to fix the mirror to the mounting surface. The elastic member has a plurality of pressing portions that contact the mirror when the elastic member presses the mirror against the mounting surface.

The pressing portions may include a first pressing portion for urging the mirror against a first portion of the mounting surface and a second pressing portion for urging the mirror against a second portion of the mounting surface, wherein the first and second pressing portions are located at different heights.

The first and second portions of the mounting surface may be a left portion and a right portion of the mounting surface, respectively.

The first and second pressing portions may contact the mirror using at least one of a face contact, a line contact, and a point contact.

The first and second pressing portions may respectively include a first protrusion and a second protrusion that abut against the mirror.

The first and second protrusions may be different sizes.

The first and second protrusions may have hemispherical shapes.

The first and second protrusions may have different radiuses and protruded lengths.

One of the first and second protrusions may press the mirror at a higher position than the other, and the protruded length of the higher positioned protrusion may be larger than the other.

The elastic member may define an opening between the first and second pressing portions, the opening being substantially parallel with the mounting surface and opened downwardly.

According to another aspect of the present invention, an optical scanning apparatus includes a mirror located in an optical path between a light source and a target object to reflect an incident light, and a mirror support device supporting the mirror. The mirror support device includes a frame having a mounting surface on which the mirror is mounted at an angle, and an elastic member. One end of the elastic member is fixed to the top of the frame, and the other end presses the mirror towards the mounting surface to fix the mirror to mounting surface. The elastic member has a plurality of pressing portions that contact the mirror when the elastic member presses the mirror to the mounting surface.

The pressing portions may include a first pressing portion for urging the mirror against a first portion of the mounting surface and a second pressing portion for urging the mirror against a second portion of the mounting surface, wherein the first and second pressing portions are located at different heights.

The first and second pressing portions may respectively include a first protrusion and a second protrusion that contact the mirror.

The first and second protrusions may have hemispherical shapes.

One of the first and second protrusions may press the mirror at a higher position than the other, and the protruded length of the higher positioned protrusion may be larger than the other.

The elastic member may define an opening between the first and second pressing portions, the opening being substantially parallel with the mounting surface and opened downwardly.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The optical scanning apparatus with the mirror support device of the present invention is used for image forming devices and image reading devices such as digital copiers, electrophotographic image forming apparatuses, facsimiles, and barcode readers. In the following description, a laser scanning unit (LSU), which is used as an optical scanning apparatus for an electrophotographic image forming apparatus, will be used as an exemplary scanning apparatus to describe the present invention.

Figure 1:
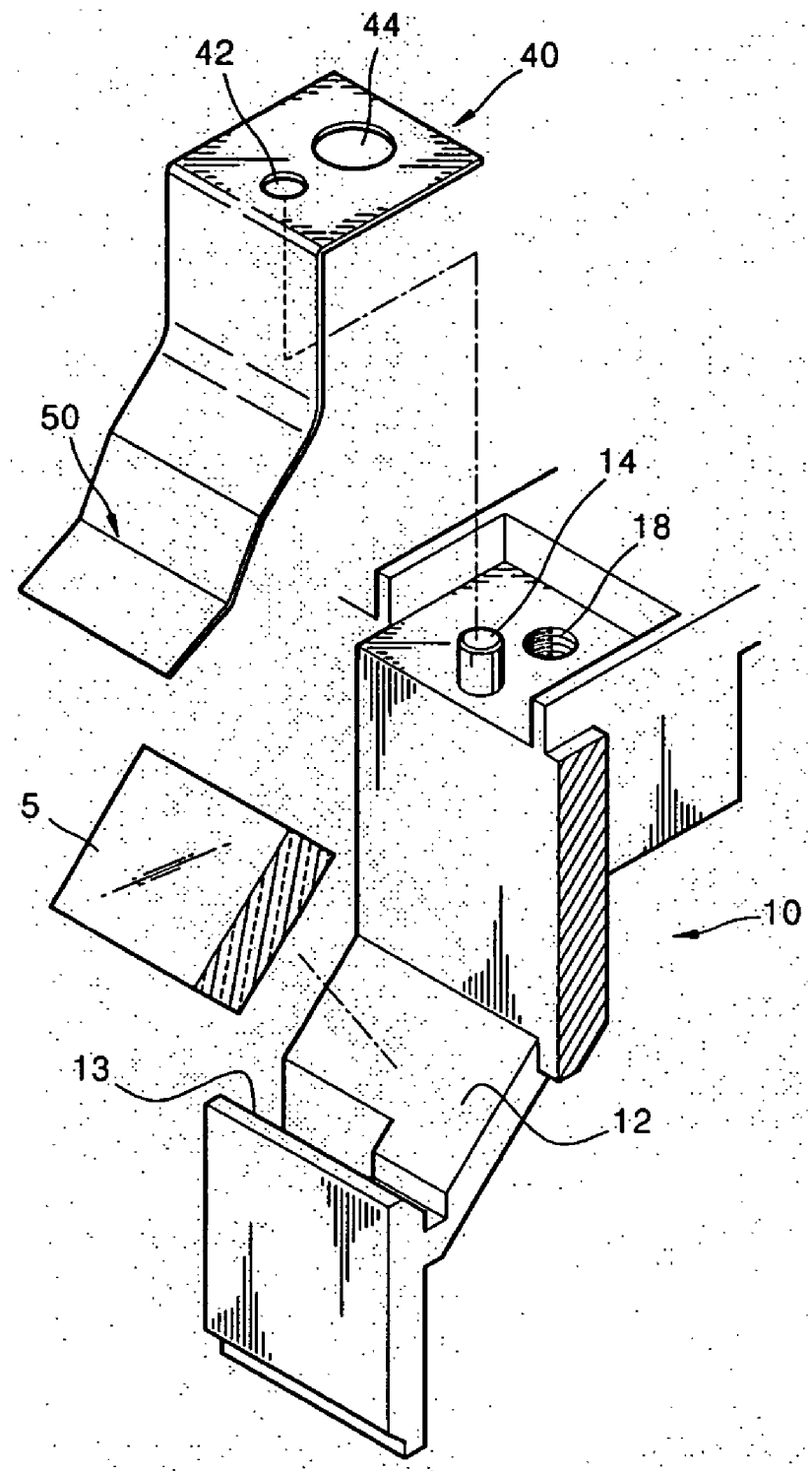
FIG. 1 is a partial exploded perspective view of a conventional mirror support device.
Figure 2:
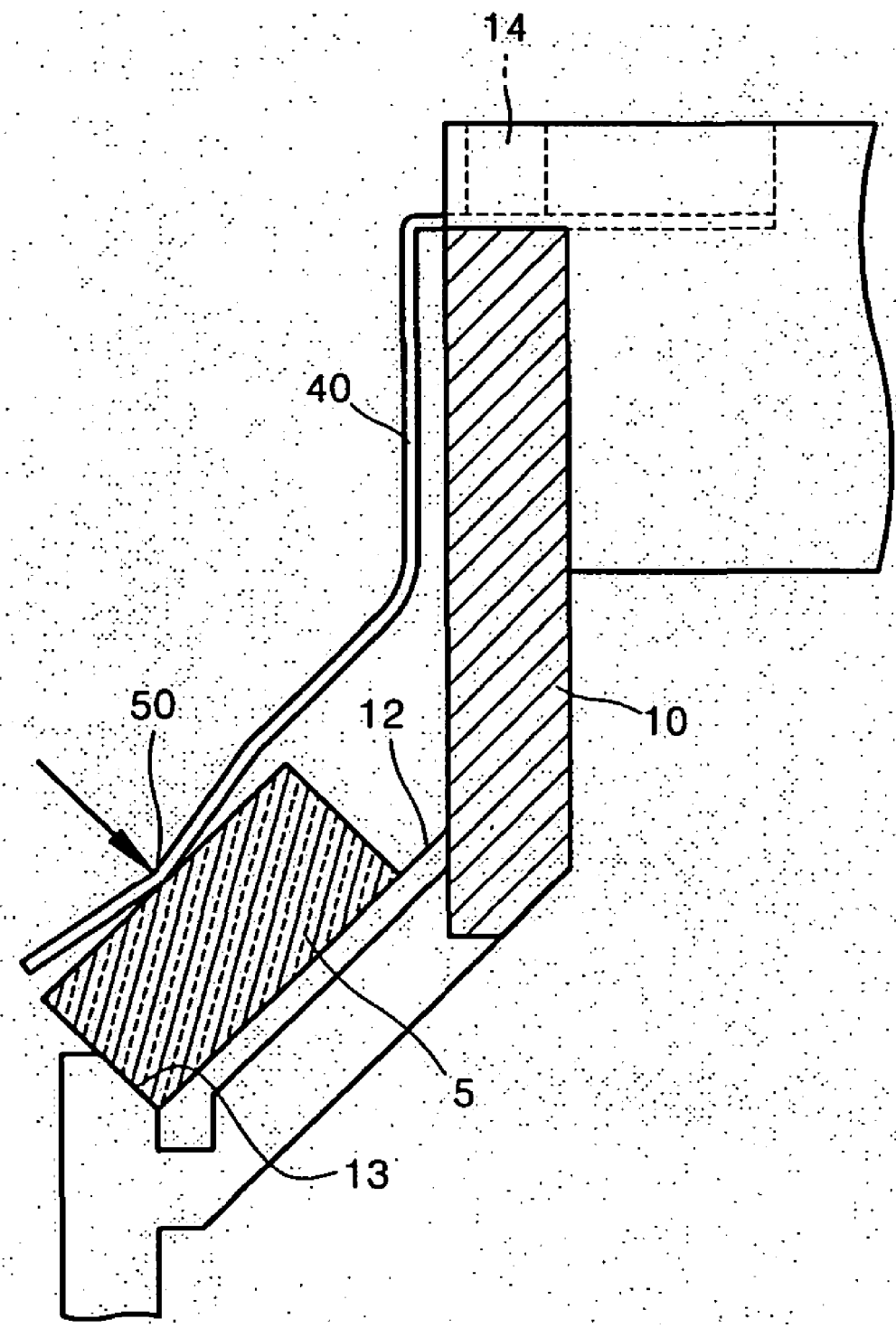
FIG. 2 is a partial side view, partially cut away, of the mirror support device depicted in FIG. 1.
Figure 3:
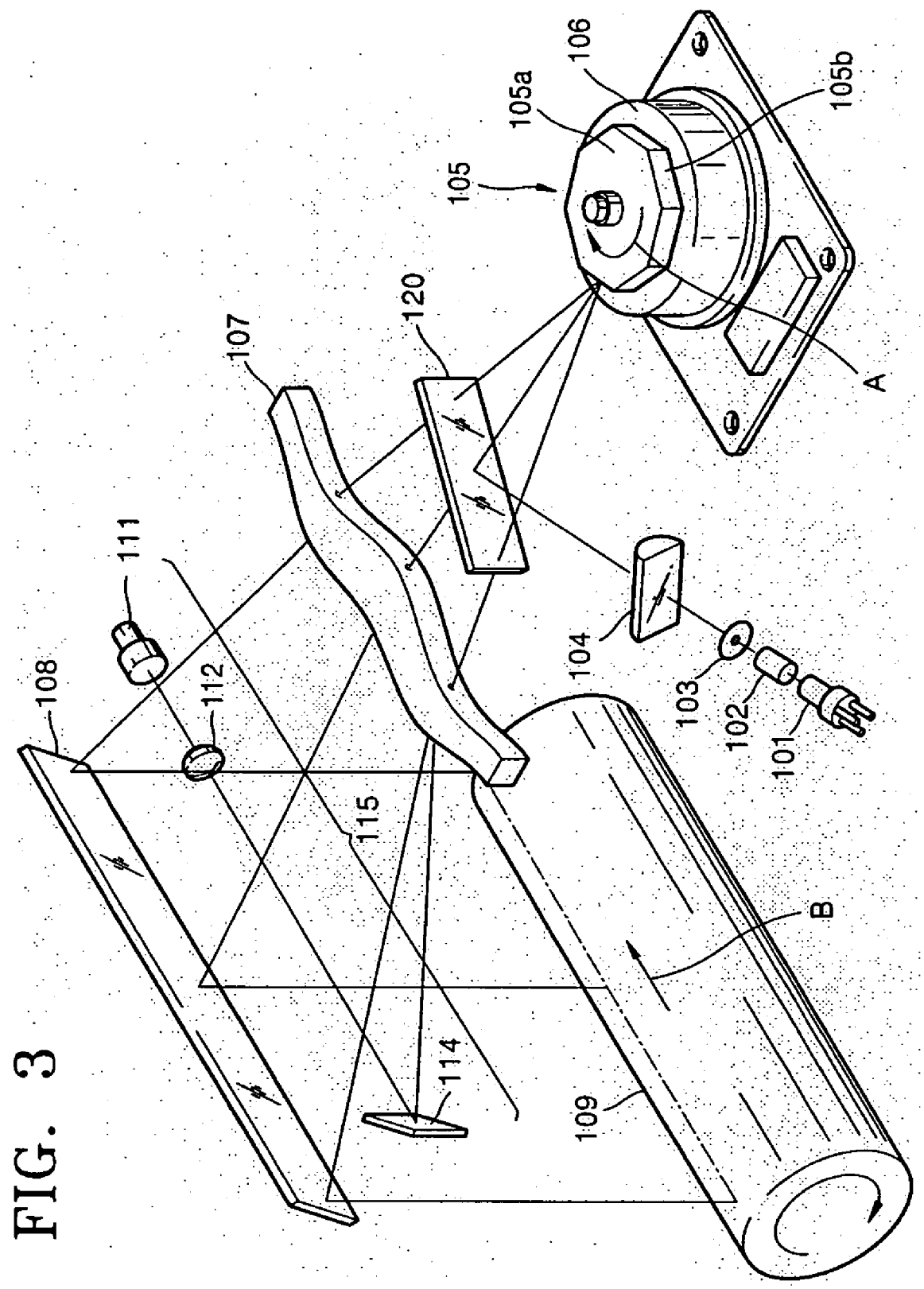
FIG. 3 is a schematic view of an optical system of an optical scanning apparatus according to an embodiment of the present invention.

FIG. 3 is a schematic view of an optical system of an optical scanning apparatus according to an embodiment of the present invention. Referring to FIG. 3, an optical scanning apparatus scans light onto a photoconductor 109 as the photoconductor 109 rotates. The optical scanning apparatus includes a light source 101, a collimator lens 102, a slit member 103, a cylinder lens 104, a beam splitter 120, a beam deflector 105, an fθ lens 107, an imaging mirror 108, and a sync detecting unit 115.

The light source 101 turns on or off under the control of a driving circuit to produce and scan at least one light beam corresponding to image data. The light source 101 may be a semiconductor laser diode or a light emitting diode (LED). The light source 101 scans a single light beam or multiple light beams. Since the light source 101 is well known to those of ordinary skill in the art, a detailed description is omitted for conciseness.

The collimator lens 102 is spaced apart from the light source 101 and collimates the light from the light source 101 to make the light parallel or converged. The slit member 103 is attached to the end of the collimator lens 102 to restrict the light passing therethrough. The cylinder lens 104 directs the light from the slit member 103 toward the beam deflector 105 linearly.

The beam splitter 120 is disposed between the beam deflector 105 and the fθ lens 107 and defines a horizontal plane together with the beam deflector 105 and the fθ lens 107. The beam splitter 120 transmits a portion of the light from the cylinder lens 104 and reflects the remaining portion. The beam splitter 120 may be a half mirror transmitting half of the incident light on the mirror.

The beam deflector 105 rotates and deflects the light reflected from the beam splitter 120 to scan the light along a horizontal path with a constant linear velocity. The incident light on the beam deflector and the deflected light from the beam deflector 105 are nearly parallel. When the beam deflector 105 rotates in the direction indicated by the arrow A, the light is scanned along the photoconductor 109 in the direction indicated by the arrow (B) to form a latent image on the photoconductor 109. The beam deflector 105 may be a polygon mirror device as shown in FIG. 3. The polygon mirror device includes a polygon mirror 105a and a driving unit 106. The polygon mirror 105a is rotatably mounted on the driving unit 106, and the driving unit 106 rotates the polygon mirror 105a clockwise or counterclockwise at a predetermined speed. The polygon mirror 105a has a plurality of mirror surfaces 105b at its sides to deflect incident light. Other type of beam deflectors, such as a hologram disc type beam deflector or a galvanometer type beam deflector, may be used for the beam deflector 105.

The fθ lens 107 is disposed in the optical path between the beam deflector 105 and the imaging mirror 108. The fθ lens 107 includes at least one lens piece. The fθ lens 107 directs the light deflected from the beam deflector 105 toward the photoconductor 109 in the main and sub-scanning directions with different magnifications. The main scanning direction is the axial direction of the photoconductor 109 (the direction of the arrow "B"). That is, the main scanning direction is the direction along which the beam deflector 105 deflects the light. The sub-scanning direction is the rotating direction of the photoconductor 109. The fθ lens 107 may be molded plastic to increase manufacturing productivity and decrease costs.

The imaging mirror 108 reflects the light from the fθ lens 107 to the surface of the photoconductor 109 to form a latent image. The image mirror 108 is inclined at an angle to reflect the light to the surface of the photoconductor 109 at a right angle. That is, the light is scanned to the photoconductor in a direction perpendicular to the sub-scanning direction.

The sync detecting unit 115 detects the light emitted from the light source 101 to adjust horizontal synchronization of the light. For this purpose, the sync detecting unit 115 includes a mirror 114, a condenser lens 112, and a sync sensor 111. The mirror 114 is disposed between the fθ lens 107 and the condenser lens 112 to reflect some of the light from the fθ lens 107 toward the condenser lens 112. The condenser lens 112 focuses the light from the mirror 114 to the sync sensor 111.

The mirror 114 may be mounted on the mirror support device of the present invention, as will be described later.

The operation of the optical scanning apparatus will now be described according to an embodiment of the present invention. The beam splitter 120 is disposed between the fθ lens 107 and the beam deflector 105. The light source 101 turns on or off under the control of the driving circuit to produce and scan at least one light beam corresponding to image data. The light emitted from the light source 101 passes through the collimator lens 102, the slit member 103, and the cylinder lens 104. A portion of the light from the cylinder lens 104 is transmitted through the beam splitter 120 and directed toward the imaging mirror 108 through the fθ lens 107. The remainder of the light from the cylinder lens 104 is reflected by the beam splitter 120 toward the beam deflector 105. The beam deflector 105 deflects the light toward the imaging mirror 108 through the fθ lens 107, and the imaging mirror 108 directs the light toward the photoconductor 109 to form a latent image. The sync sensor 111 detects the light passed through the fθ lens 107 to adjust horizontal synchronization of the light. The mirror 114 mounted on the mirror support device reflects some of the light from the fθ lens 107 toward the condenser lens 112.

The optical scanning apparatus includes mirrors such as the imaging mirror 108 and the mirror 114 that are placed in the optical path at an angle. The mirrors may be mounted on frames to change the direction of incident light.

Figure 4:
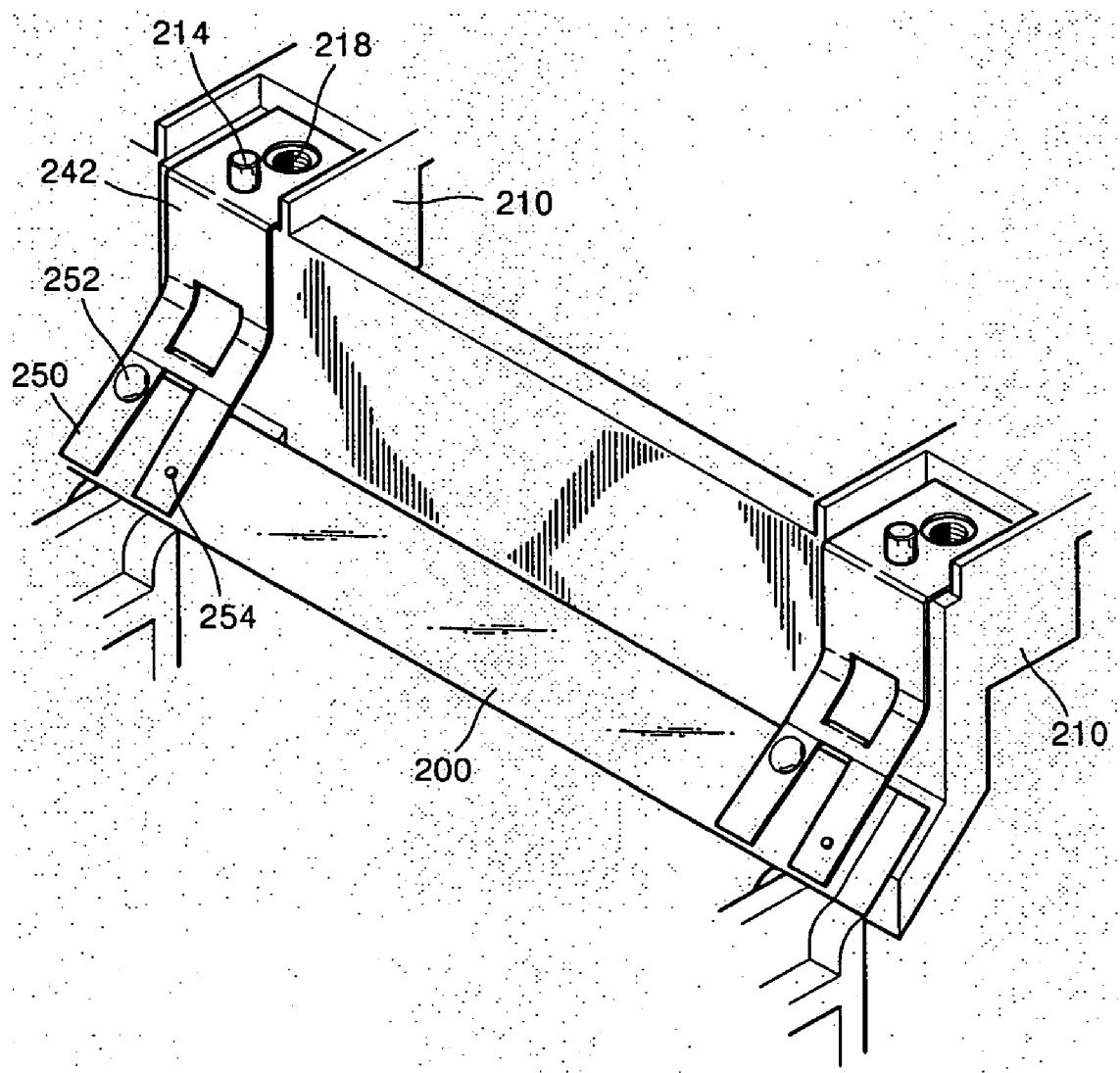
FIG. 4 is a schematic perspective view of a mirror support device according to an embodiment of the present invention.

A mirror support device for supporting the mirror mounted on the frame at a predetermined angle will now be described. FIG. 4 is a schematic perspective view of a mirror support device according to a preferred embodiment of the present invention, and FIG. 5 is a side view of the mirror support device depicted in FIG. 4.

Figure 5:
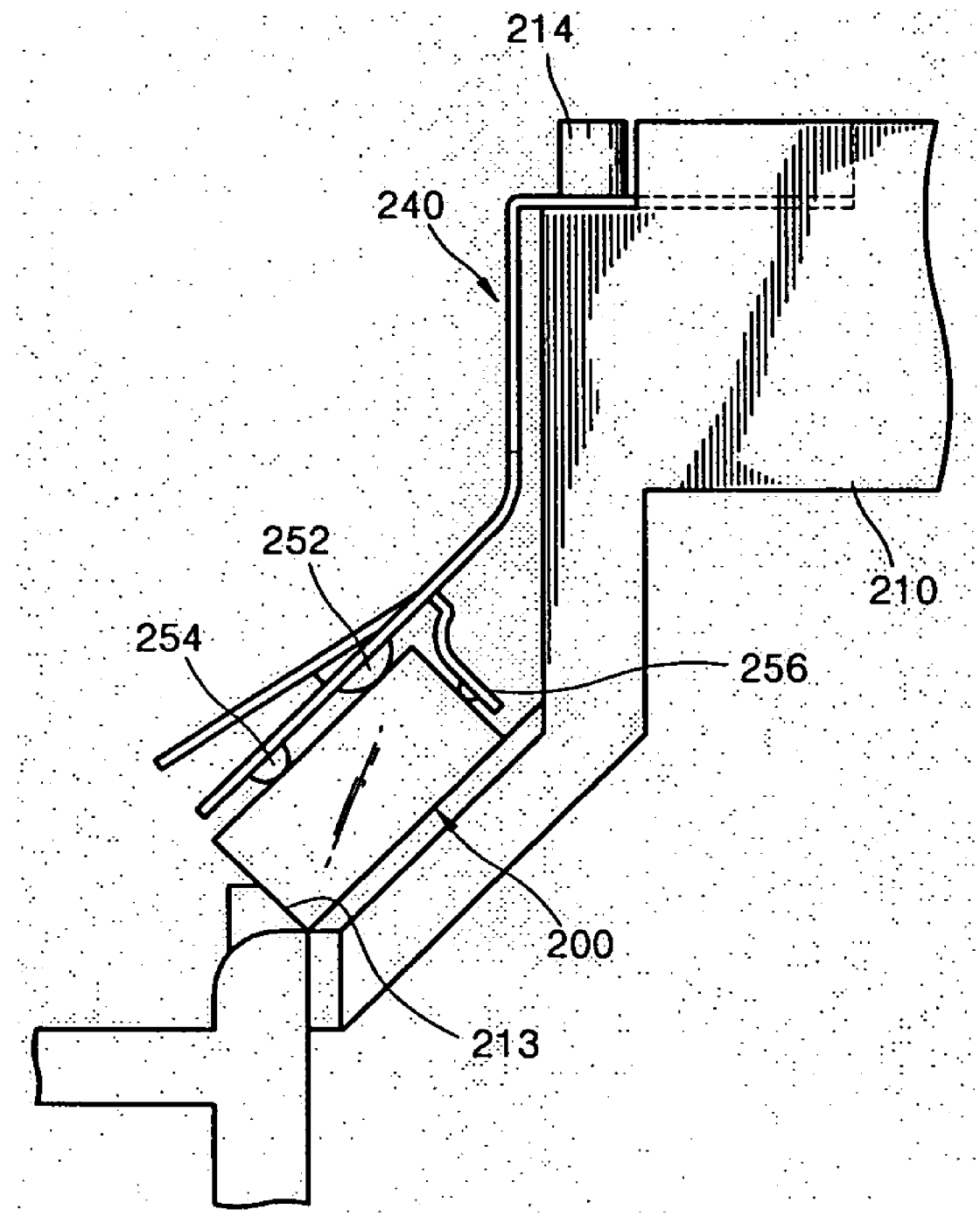
FIG. 5 is a partial side view of the mirror support device depicted in FIG. 4.

Referring to FIGS. 4 and 5, a mirror support device includes a wide mirror 200, a frame 210, and elastic members 240. The mirror support device fixes the mirror 200 to the frame 210 by holding each side of the mirror 200 against the frame 210.

Figure 6:
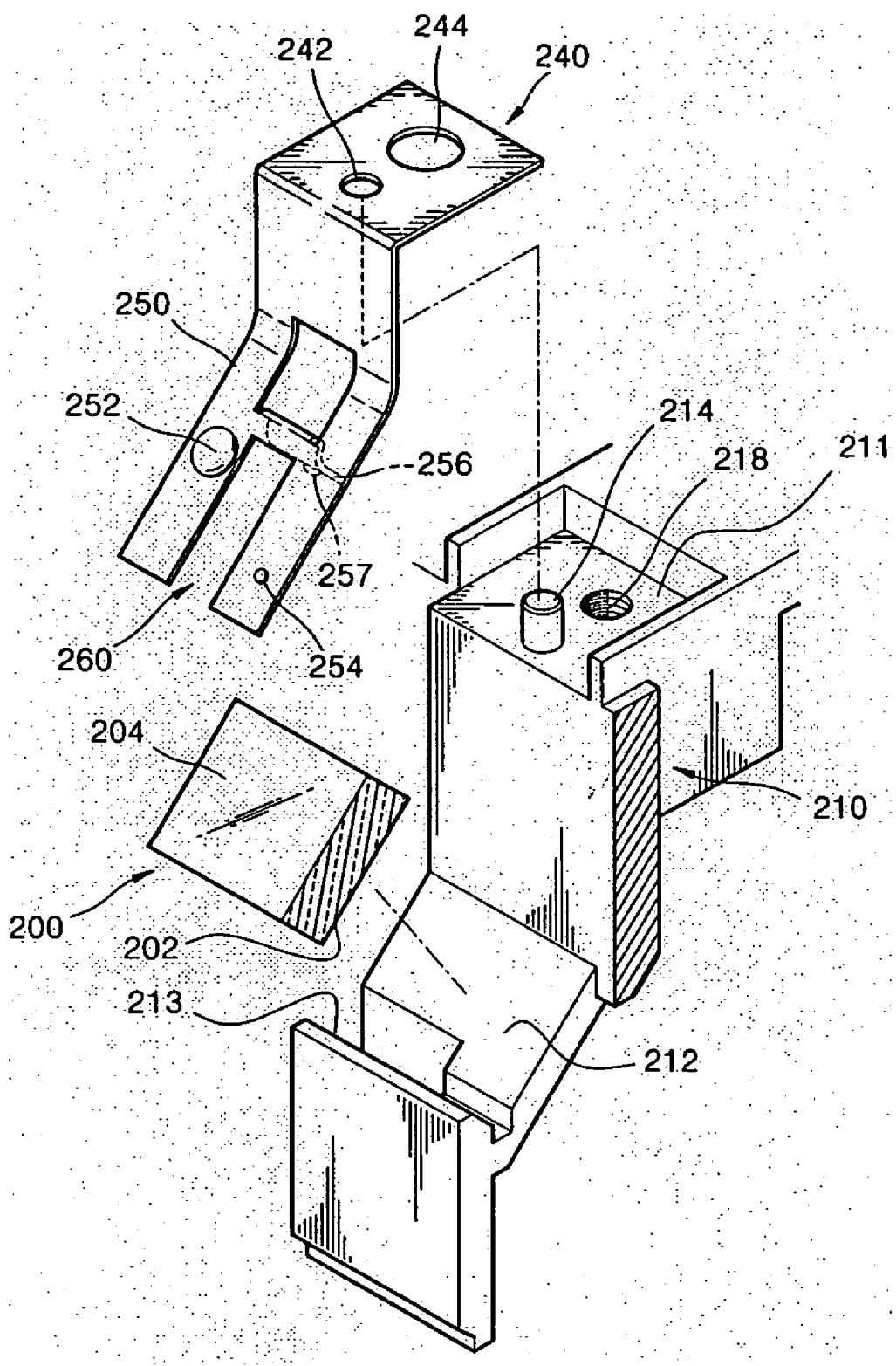
FIG. 6 is an exploded partial perspective view of the mirror support device depicted in FIG. 4.
Figure 7:
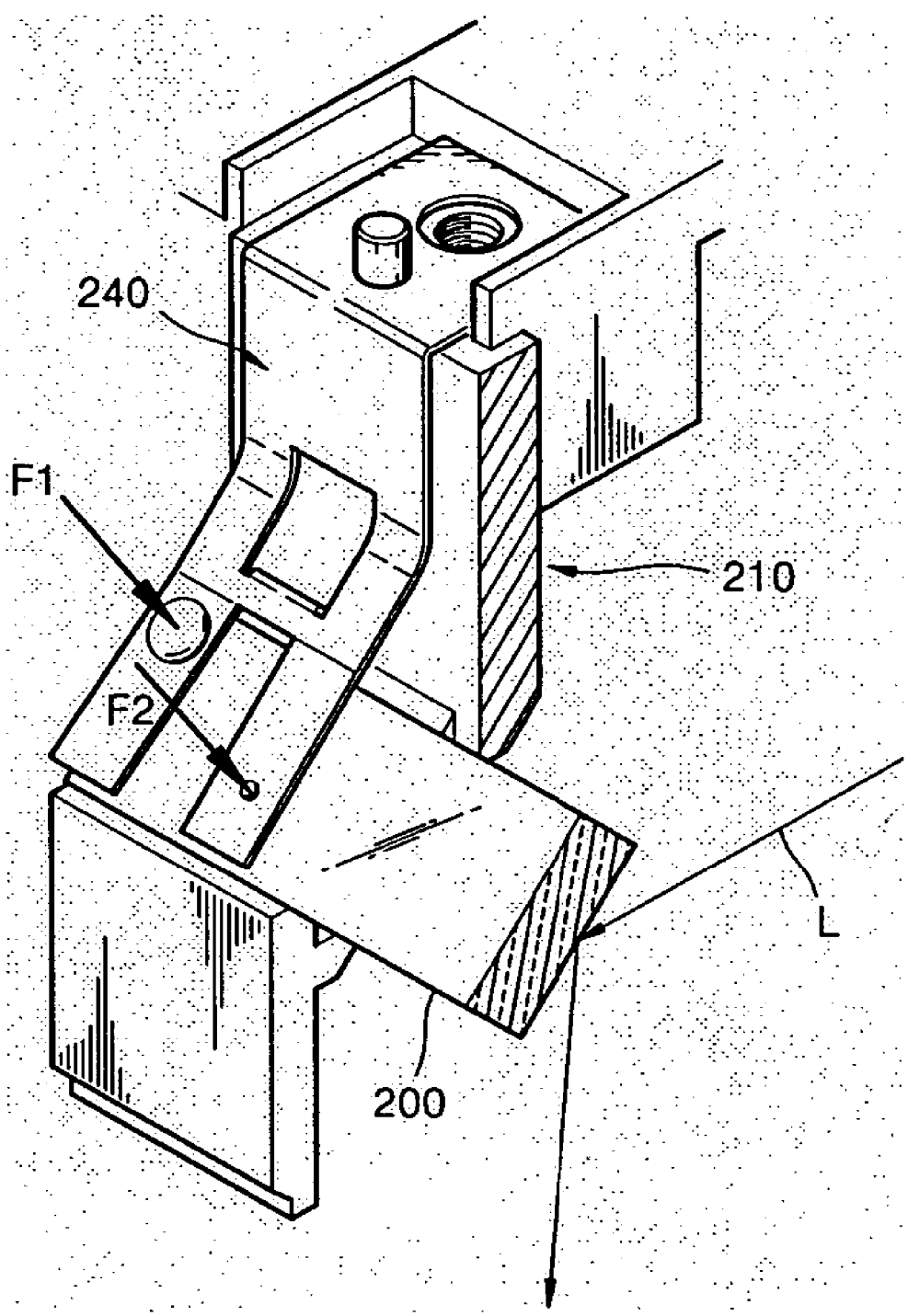
FIG. 7 is an assembled partial perspective view of the mirror support device depicted in FIG. 6.

FIG. 6 is an exploded partial perspective view of a mirror support device according to an embodiment of the present invention, and FIG. 7 is an assembled partial perspective view of the mirror support device depicted in FIG. 6. Referring to FIGS. 6 and 7, the mirror 200 has a mirror surface 204 for reflecting incident light (L) in a predetermined direction.

The frame 210 includes a mounting surface 212, a supporting surface 213, and a guide 214. The mounting surface 212 is inclined to receive the mirror 200 at a predetermined angle. The supporting surface 213 is located under the mounting surface 212. The supporting surface 213 protrudes from the mounting surface 212 to support the bottom of the mirror 200 and prevent the mirror 200 from slipping down. The guide 214 protrudes from the top surface 211 of the frame 210. The guide 214 couples with a guide hole 242 of the elastic member 240. That is, the guide 214 determines the installation location of the elastic member 240. Also, the frame 210 has a coupling hole 218 on its top surface. The coupling hole 218 is spaced apart from the guide 214 and is aligned with a coupling hole 244 of the elastic member 240. A coupling member, such as a screw (not shown), may be secured in the coupling hole 218 through the coupling hole 244 to fix the elastic member 240 to the frame 210.

Figure 8:
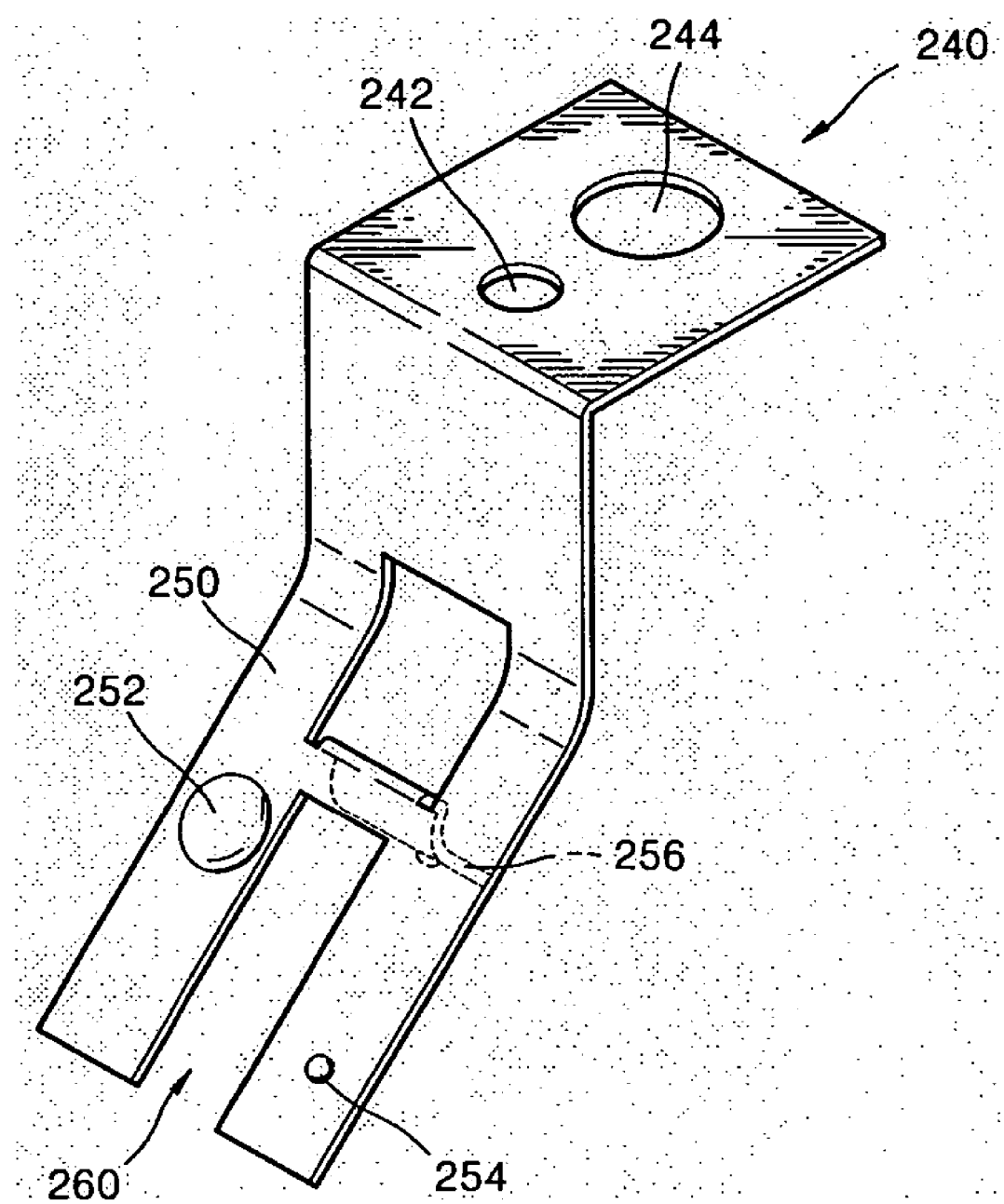
FIG. 8 is a perspective view of an elastic member of the mirror support device depicted in FIG. 6.
Figure 9:
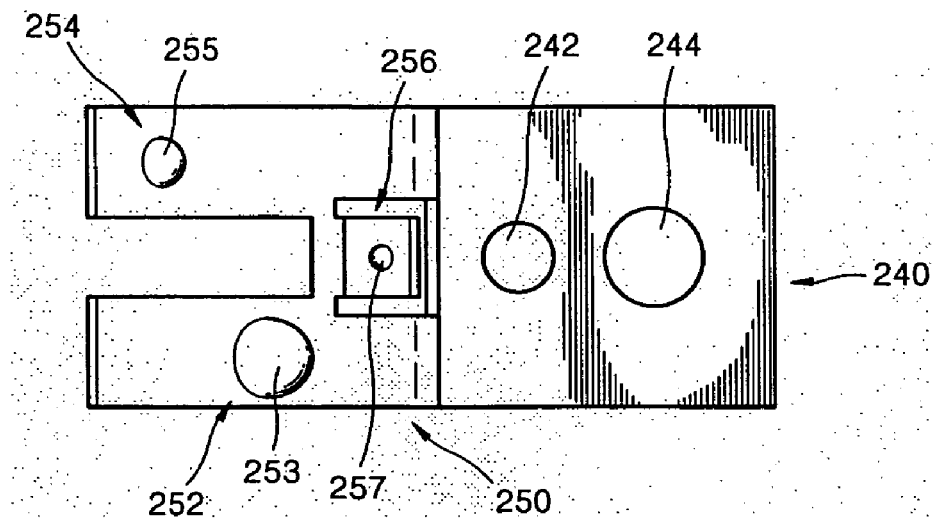
FIG. 9 is a bottom view of the elastic member depicted in FIG. 8.
Figure 10:
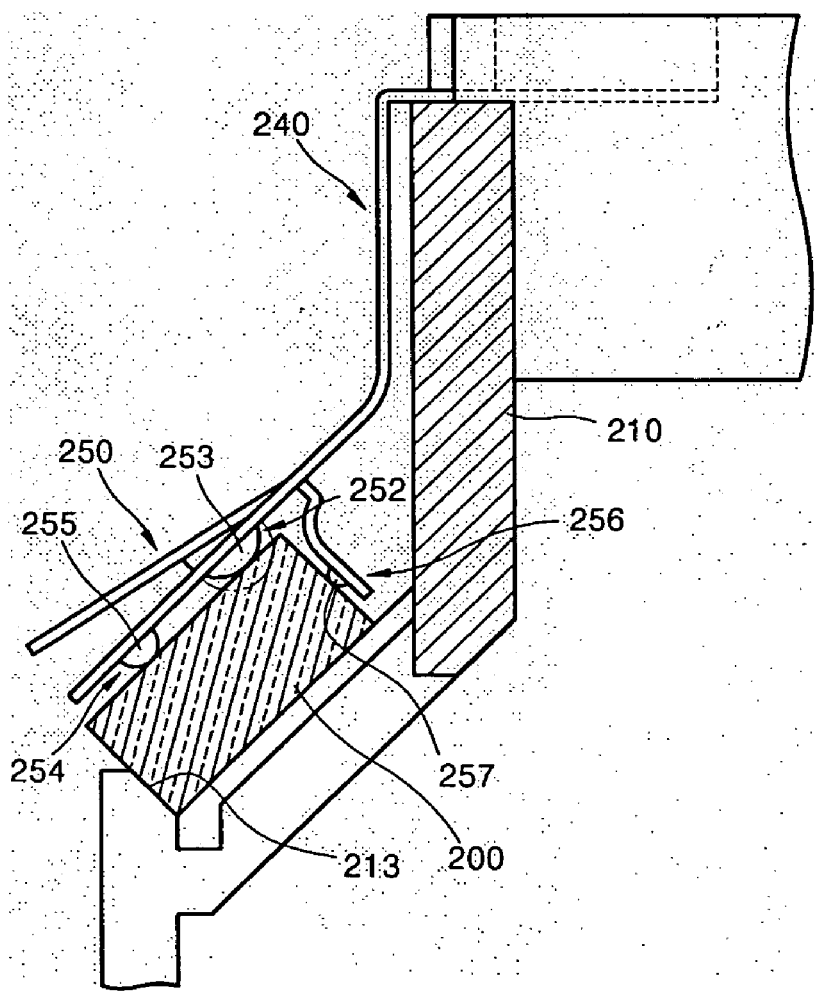
FIG. 10 is a partial side view, partially cut away, of a mirror support device according to an embodiment of the present invention.
Figure 11:
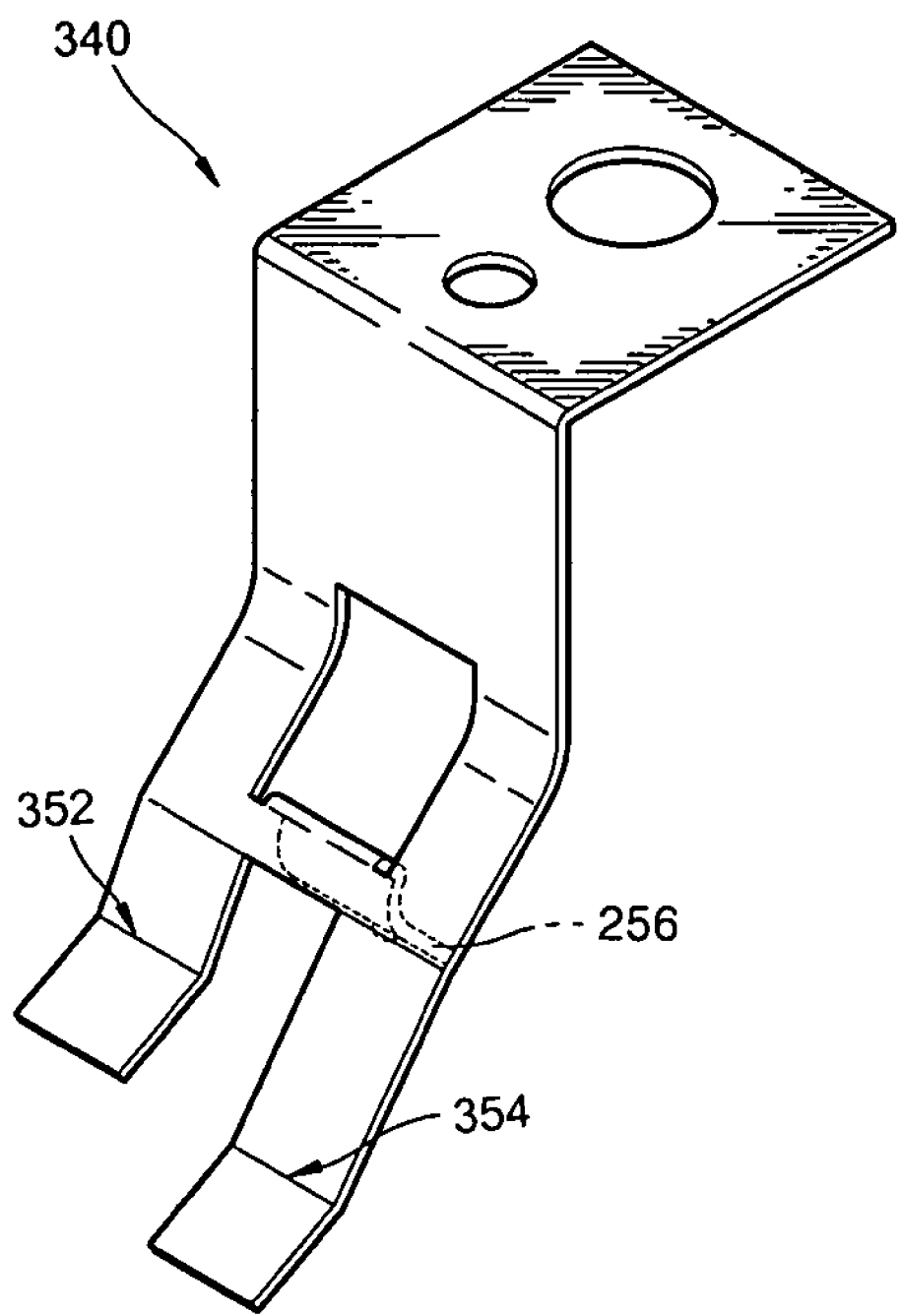
FIG. 11 is a perspective view of an elastic member according to another embodiment of the present invention.
Figure 12:
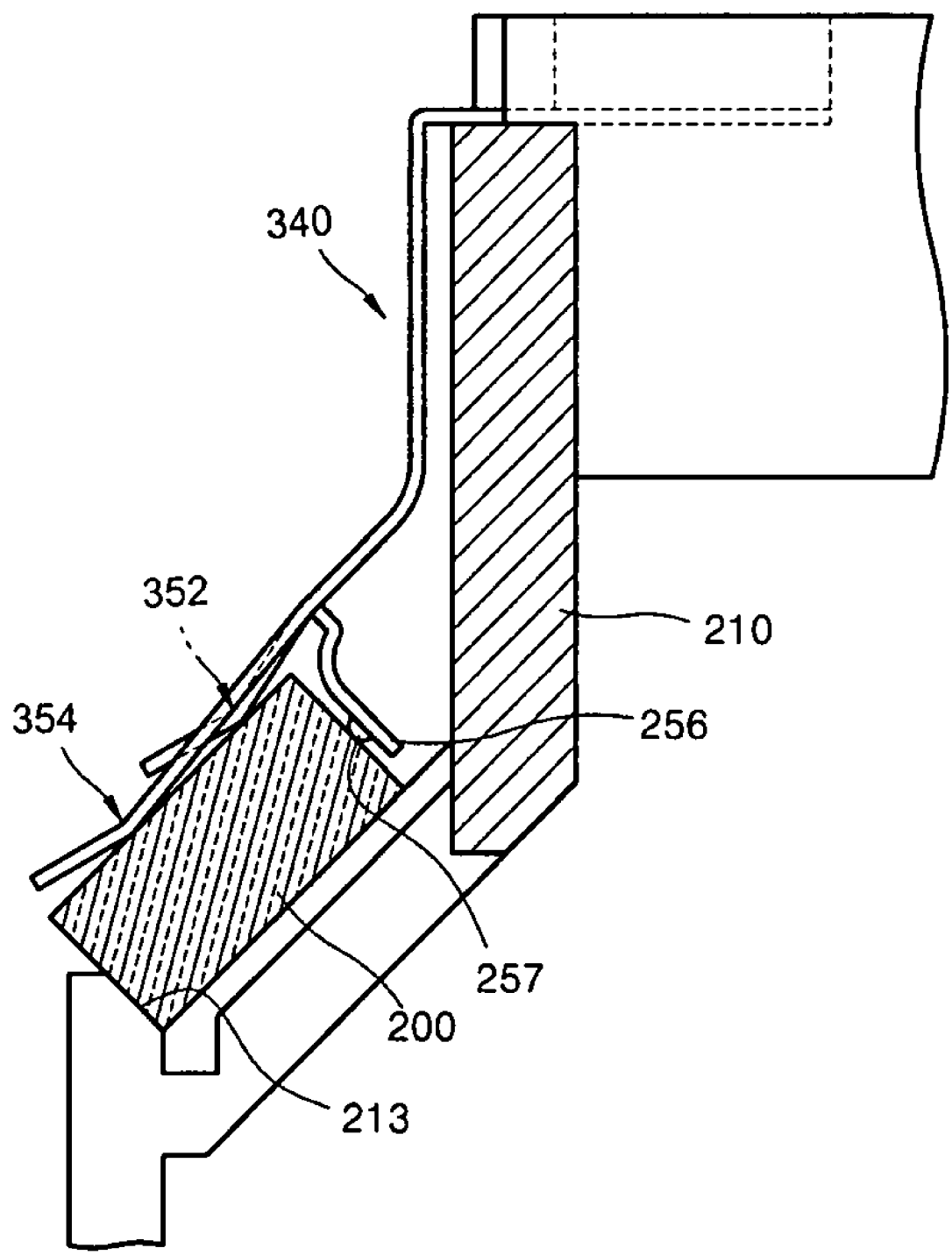
FIG. 12 is a partial side view, partially cut away, of a mirror support device provided with the elastic member depicted in FIG. 11.
Figure 13:
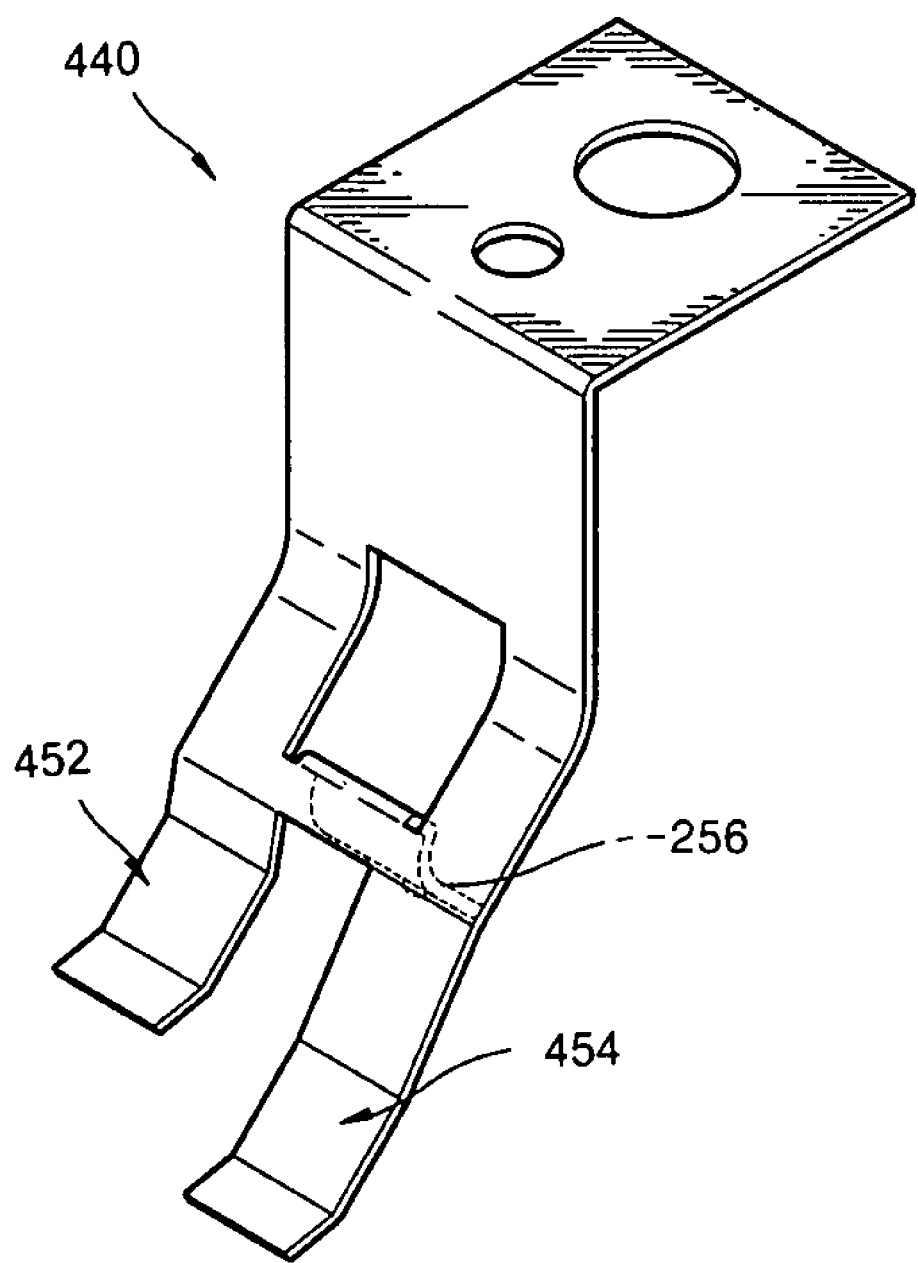
FIG. 13 is a perspective view of an elastic member according to an embodiment of the present invention.
Figure 14:
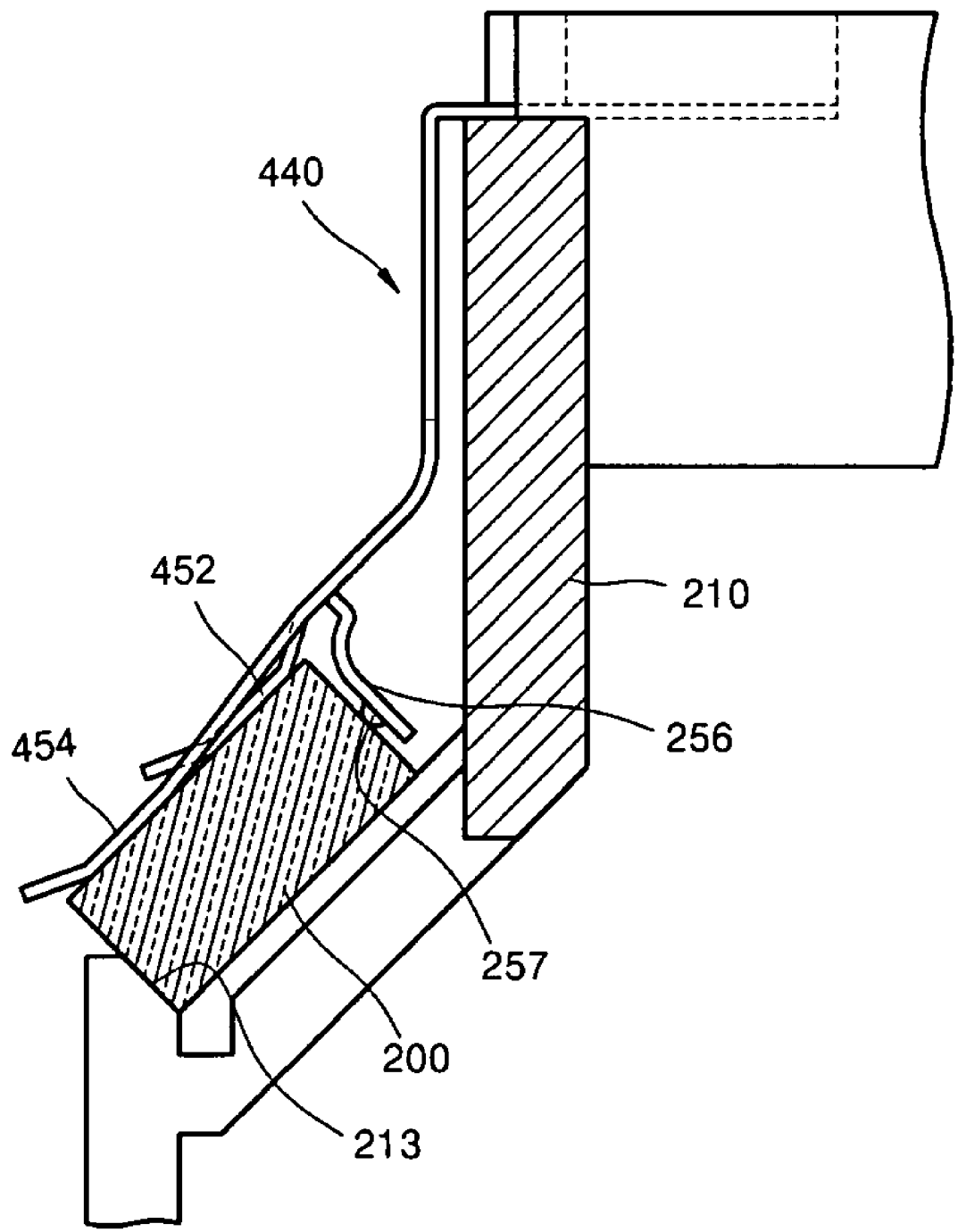
FIG. 14 is a partial side view, partially cut away, of a mirror support device provided with the elastic member depicted in FIG. 13.

FIG. 8 is a perspective view of an elastic member of the mirror support device depicted in FIG. 6, FIG. 9 is a bottom view of the elastic member depicted in FIG. 8, and FIG. 10 is a partial side view, partially cut away, of a mirror support device provided with the elastic member depicted in FIG. 9. FIG. 11 is a perspective view of an elastic member according to another embodiment of the present invention, and FIG. 12 is a partial side view, partially cut away, of a mirror support device provided with the elastic member depicted in FIG. 11. FIG. 13 is a perspective view of an elastic member according to a further embodiment of the present invention, and FIG. 14 is a partial side view, partially cut away, of a mirror support device provided with the elastic member depicted in FIG. 13.

Referring to FIGS. 8 through 10, the elastic member 240 has a first end fixed at the top of the frame 210. The other, or second, end of the elastic member urges the mirror 200 toward the mounting surface 212. That is, the elastic member 240 biases the mirror 200 towards the mounting surface 212 to elastically fix the mirror 200 to the frame 210. The shape of the elastic member 240 is like the shape of the frame 210 so that the elastic member 240 can effectively hold the mirror without interference with other parts. The elastic member 240 includes a plate part 250 at the other end. The plate part 250 is substantially flat and parallel with the mirror 200. The plate part 250 includes a plurality of pressing portions that press the mirror 200, preferably tightly, to fix the mirror 200 to the mounting surface 212 of the frame 210.

The pressing portions include a first pressing portion 252 to press the mirror 200 against a first portion of the mounting surface 212 and a second pressing portion 254 to press the mirror 200 against a second portion of the mounting surface 212. The first portion and the second portion of the mounting surface may be a left portion and a right portion of the mounting surface, respectively. The first and second pressing portions 252 and 254 may be located at different heights. With this arrangement of the first and second pressing portions 252 and 254, the mirror 200 can be more stably fixed to the mounting surface 212.

The first and second pressing portions 252 and 254 may contact the mirror 200 using at least one of a face contact, a line contact, and a point contact.

The contact surface between the mirror 200 and the first and second pressing portions can be changed depending on the shapes of the first and second pressing portions Referring to FIGS. 11 to 12, for example, first and second pressing portions 352 and 354 of elastic member 340 are adapted for line contact with mirror 200. And referring to FIGS. 13 to 14, first and second pressing portions 452 and 454 of elastic member 440 are adapted for face contact with mirror 200.

The first and the second pressing portions 252 and 254 will now be described when they are in point-contact with the mirror 200. Referring again to FIG. 10, the first and second pressing portions 252 and 254 respectively include a first protrusion 253 and a second protrusion 255 that press against the mirror. The elastic force of the elastic member 240 acts on the mirror 200 through the first and second protrusions 253 and 255. That is, the first and second protrusions 253 and 255 enable more effective pressing, such that the mirror 200 can be fixed to the mounting surface more securely and stably. Increasing the sizes of the first and second protrusions 253 and 255 may increase the pressing force.

The mirror 200 may deviate from its proper mounting position due to impact. To prevent deviation of the mirror 200, the first and second protrusions 253 and 255 may be sized differently. That is, since the first protrusion 253 is located on the left side at a higher position and the second protrusion 255 is located on the right side at a lower position, making the first protrusion 253 protrude more than the second protrusion 255 prevents the mirror 200 from deviating from the proper mounting position more effectively.

As shown in FIGS. 9 and 10, The first and second protrusions 253 and 255 may have hemispherical shapes with different radiuses and protruded lengths. Also, the first protrusion 253, which is located higher than the second protrusion 255, may protrude more than the second protrusion 255.

The elastic member 240 defines an opening 260 between the first and second pressing portions 252 and 254 (see FIG. 8). The opening 260 is substantially parallel with the mounting surface 212 and opened downwardly. Therefore, the first and second pressing portions 252 and 254 can elastically press the mirror 200 independently of each other. That is, the size and shape of one pressing portion is relatively independent of the pressing action of the other portion.

The plate part 250 may further include a third pressing portion 256 to elastically urge the mirror 200 toward the supporting surface 213. The third pressing portion 256 has a flat shape and is bent from the plate part 250 at a substantially right angle. The third pressing portion 256 elastically urges the mirror 200 from the top toward the supporting surface 213. The third pressing portion 256 includes a third protrusion 257 that contacts and presses the top of the mirror 200. The third protrusion 257 enables more stable control of the mirror. Further, the upper end of the elastic member 240 has a guide hole 242 and a coupling hole 244. The elastic member 240 may be a leaf spring made of stainless steel.

In the illustrative embodiments of the present invention, the elastic member 240 is configured to press a surface 204 (refer to FIG. 6) opposite the mirror surface 202 to fix the mirror 200 to the mounting surface 212. It will be apparent to those of skill in the art that the configuration of the elastic member can be changed in various forms without departing from the spirit and scope of the present invention. For example, the elastic member 240 can be configured to press the mirror surface 202 of the mirror 200 to fix the mirror 200.

Also, in the illustrative embodiments, the first and second pressing portions 252 and 254 of the elastic member 240 are configured to press left and right portions of the mirror 200, respectively. This configuration can be changed such that the first and second pressing portions 252 and 254 press right and left portions of the mirror 200. That is, the configuration can be changed so that the first pressing portion 252 presses a first portion of the mirror 200, and the second pressing portion 254 presses a second portion of the mirror 200.

Furthermore, conventional mirror support devices cannot cope with machining errors in the mounting surface 212. That is, the mirror 200 may come off from the mounting surface 212 or may receive the pressing force of the elastic member 240 ineffectively. The mirror support device of the present invention, however, is designed to press the mirror 200 with the first and second pressing portions 252 and 254 in the directions of arrows F1 and F2 (refer to FIG. 7). That is, the first and second pressing portions 252 and 254 press the left and right portions of the mirror 200 at different heights, such that the mirror 200 can be securely and stably fixed to the frame 210 even when the mirror 200 or the mounting surface 212 has a machining error. Therefore, the mirror 200 can be supported and fixed without loosening, vibrating, and deviating even when impact or shock is applied.

In addition, the first and second pressing portions 252 and 254 include the first and second protrusions 253 and 255, such that the mirror 200 can be fixed with stronger pressing forces. Also, the opening 260 defined between the first and second pressing portions 252 and 254 enables the first and second pressing portions 252 and 254 to press the mirror 200 independently. Therefore, the mirror 200 can be more securely and stably fixed. Further, the first and second protrusions 253 and 255 have different radiuses and protruded lengths, such that the mirror 200 is held more tightly and can be prevented from moving.

As described above, the mirror support device of the present invention can fix the mirror to the frame more securely and stably, and prevent the fixed mirror from coming off or deviating from the frame even when the frame or the mirror has a machining error.

The mirror support device of the present invention, and an optical scanning apparatus using the same, is designed such that the pressing force increases and more effectively acts to supports and fix the mirror. Therefore, the mirror can be fixed more securely and stably without deviation and deformation, preventing light scanning error and image quality degradation.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus, comprising:
   a light source that turns on or off to produce a light beam corresponding to image data;

a collimator lens spaced apart from the light source to collimate the light from the light source;

a rectangular mirror, including a first side portion, a second side portion, and a center portion of an outer surface, and a back surface opposite to the outer surface, wherein one of the outer surface and the back surface is a mirror surface;

a beam deflector that deflects the collimated light to scan light onto a photoconductor via the rectangular mirror;

a frame having a mounting surface on which the back surface of the mirror is mounted and a supporting surface on which a side surface adjacent to the outer surface of the mirror is mounted;

a first elastic member having a first pressing portion and a second pressing portion pressing the first side portion of the mirror towards the mounting surface; and a second elastic member having a first pressing portion and a second pressing portion pressing the second side portion of the mirror towards the mounting surface;

wherein the mirror is mounted in a mounted position via the frame, the first elastic member and the second elastic member such that the back surface of the mirror is supported by the mounting surface of the frame;

wherein the first pressing portion of the first elastic member is configured to press against a first region of the first side portion of the mirror and the second pressing portion of the first elastic member is configured to press against a second region of the first side portion located lower than the first region of the first side portion;

wherein the first pressing portion of the second elastic member is configured to press against a first region of the second side portion of the mirror and the second pressing portion of the second elastic member is configured press against a second region of the second side portion located lower than the first region of the second side portion; and wherein each of the first elastic member and the second elastic member has an opening disposed between the first pressing portion and the second pressing portion, so that the first pressing portion and the second pressing portion may elastically press the mirror independently of each other.

2. The apparatus of claim 1, wherein the first and second pressing portions of the first and second elastic members contact the mirror using at least one of a face contact, a line contact, or a point contact.

3. The apparatus of claim 1, wherein the first and second pressing portions of the first and second elastic members respectively include a first protrusion and a second protrusion that press against the mirror.

4. The apparatus of claim 3, wherein the first and second protrusions are differently sized.

5. The apparatus of claim 3, wherein the first and second protrusions have hemispherical shapes.

6. The apparatus of claim 5, wherein the first and second protrusions have different radiuses and protruded lengths.

7. The apparatus of claim 6, wherein one of the first and second protrusions presses the mirror at a higher position than the other, and the protruded length of the higher positioned protrusion is larger than the other.

8. The apparatus of claim 7, wherein the respective openings disposed between the first and second pressing portions are substantially parallel with the mounting surface and opened downwardly.

9. The apparatus of claim 1, wherein the respective openings disposed between the first second pressing portions are substantially parallel with the mounting surface and opened downwardly.

10. The apparatus of claim 9, wherein the first and second pressing portions of the first and second elastic members respectively include a first protrusion and a second protrusion that press against the mirror.

11. The apparatus of claim 10, wherein the first and second protrusions have hemispherical shapes with different radiuses and protruded lengths.

12. The apparatus of claim 1, wherein:

the supporting surface forms a predetermined angle with the mounting surface;

the first elastic member further comprises a third pressing portion directly contacting the mirror and pressing the mirror towards the supporting surface; and the second elastic member further comprises a third pressing portion directly contacting the mirror and pressing the mirror towards the supporting surface.

13. The apparatus of claim 1, wherein the first elastic member has one end fixed to the frame and the other end elastically urging the mirror toward the mounting surface of the frame; and the second elastic member has one end fixed to the frame and the other end elastically urging the mirror toward the mounting surface of the frame.

14. The apparatus of claim 1, wherein one of the first and second regions of the first side portion is located closer to the center portion of mirror than the other of the first and second regions of the first side portion, and one of the first and second regions of the second side portion is located closer to the center portion of the mirror than the other of the first and second regions of the second side portion.

15. An apparatus, comprising:

a rectangular mirror located in an optical path between a light source and a target object, the mirror including a back surface and an outer surface opposite to the back surface, the outer surface including a first side portion, a second side portion, and a center portion between the side portions; wherein one of the back and outer surfaces is a mirror surface;

a frame having a mounting surface on which the back surface of the mirror is mounted and a supporting surface on which a side surface adjacent to the outer surface of the mirror is mounted, wherein the supporting surface forms a predetermined angle with the mounting surface;

a first elastic member having a first pressing portion pressing the first side portion of the mirror towards the mounting surface and a second pressing portion pressing the mirror toward the supporting surface; and a second elastic member having a first pressing portion pressing the second side portion of the mirror towards the mounting surface and a second pressing portion pressing the mirror towards the supporting surface;

wherein the first elastic member further includes a third pressing portion pressing the first side portion of the mirror towards the mounting surface, wherein the first pressing portion of the first elastic member is configured to press against a first region of the first side portion of the mirror and the third pressing portion of the first elastic member is configured to press against a second region of the first side portion located lower than the first region of the first side portion;

wherein the second elastic member further includes a third pressing portion pressing the second side portion of the mirror towards the mounting surface, wherein the first pressing portion of the second elastic member is configured to press against a first region of the second side portion of the mirror and the third pressing portion of the second elastic member is configured to press against a second region of the second side portion located lower than the first region of the second side portion; and wherein each of the first and second elastic members has an opening disposed between the first pressing portion and the second pressing portion so that the first pressing portion and the second pressing portion may elastically press the mirror independently of each other.

16. The apparatus of claim 15, wherein the target object is a photoconductor of an image forming apparatus.

17. The apparatus of claim 15, wherein one of the first and second regions of the first side portion is located closer to the center portion of the mirror than the other of the first and second regions of the first side portion; and one of the first and second regions of the second side portion is located closer to the center portion of the mirror than the other of the first and second regions of the second side portion.

18. The apparatus of claim 15, wherein the first and third pressing portions respectively include a first protrusion and a second protrusion that press against the mirror.

19. The apparatus of claim 18, wherein the first and second protrusions have hemispherical shapes, respectively.

20. The apparatus of claim 19, wherein one of the first and second protrusions presses the mirror at a higher position than the other, and the protruded length of the higher positioned protrusion is larger than the other.

21. The apparatus of claim 20, wherein each of the first and second the elastic members has an opening disposed between the respective first pressing portion and the respective third pressing portion, the opening being substantially parallel with the mounting surface and opened downwardly.

* * * * *